March 12, 1957        F. F. LINN        2,784,964
VEHICLE AXLE
Filed Jan. 19, 1953
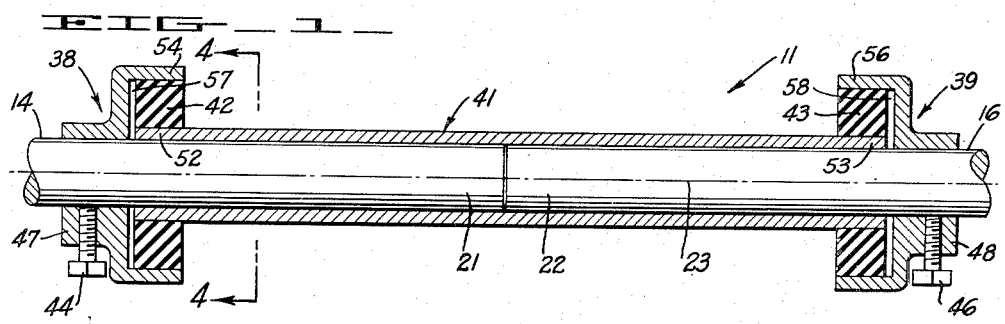
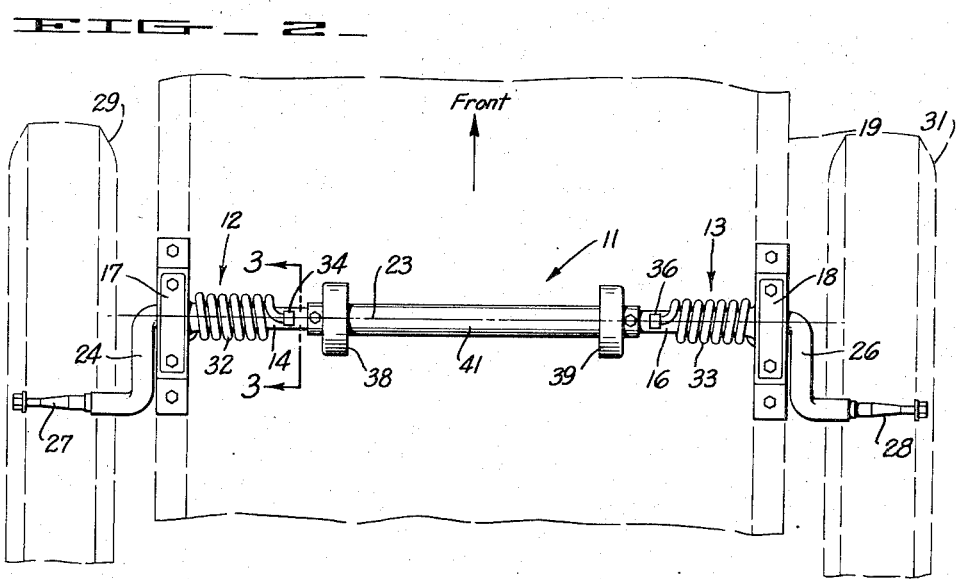
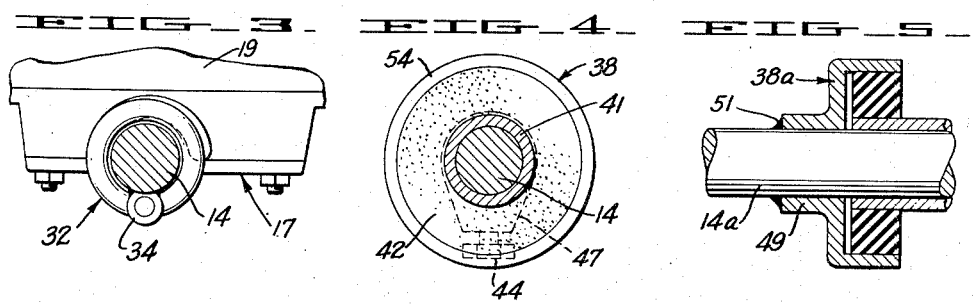
INVENTOR.
Frank F. Linn
BY Manfred W. Warren
His attorney

United States Patent Office 2,784,964
Patented Mar. 12, 1957

2,784,964

VEHICLE AXLE

Frank F. Linn, Oakland, Calif.

Application January 19, 1953, Serial No. 331,876

4 Claims. (Cl. 267—11)

The invention relates to vehicle axles and, more particularly, to the so-called "level load" type such as shown and described in my earlier Patents No. 2,426,513, issued August 26, 1947, and No. 2,455,787, issued December 7, 1948.

The level load axle as disclosed in the aforementioned patents consists briefly of a pair of opposed wheel supporting arms secured to the ends of a shaft journaled in bearings attached to the vehicle body, and a pair of helical springs fastened to the shaft and the bearings for resiliently resisting rotation of the shaft to thereby yieldably support the vehicle body on the axle assembly. The "level load" feature of such an axle results from the connection of the wheel supporting arms through the shaft, which provides for equal deflection of both wheels when load is imposed on any part of the vehicle body. The advantages occurring from this construction are well known in the art and include the ability of the axle to maintain the vehicle body in level position during loading or when in motion, whether or not the load is centered laterally, and to afford a lower center of gravity and consequent lower body height than is possible with conventional axles.

Other and different advantages are afforded by the so-called independent system of wheel suspension in which the wheels may be individually deflected. Among the advantages offered by individual suspension of the wheels are a softer spring action and the absorption of excessive road shock caused by the encounter of one of the wheels with an obstacle such as a bump or chuck hole.

The advantages of the level loading axle and the advantages of independent wheel suspension systems have been combined in a unitary axle assembly which will act as a level load axle under normal load conditions, but which will function to permit a resilient rotative displacement of the wheel supporting arms when one or the other of the wheels strikes an obstacle. Such an axle assembly is disclosed in my copending application Serial No. 186,-745, filed September 26, 1950, now Patent 2,641,464 issued June 9, 1953. The normal development and evolution of the level load axle in better adapting it to manufacturing purposes has led to forming the axle with a solid transverse axle shaft, rather than the hollow tubular type of axle shaft shown in the above mentioned patents and application and this change in construction has presented entirely new problems in endeavoring to accomplish the combination type axle of the character described.

It is, accordingly, an object of the present invention to provide an axle construction which will enable a combination of the level load axle and the independent type of wheel suspension with the attendant advantages of each and which is adapted to accommodate the newer solid form axle above described.

Another object of the present invention is to provide the foregoing combination by means of a unit which may be used as an attachment for existing level load axles.

A further object of the present invetnion is to provide a unit of the character described which may be used with various combinations of lengths of axle shafts to accommodate a wide variety of vehicle widths, with the unit also affording increased economy both in manufacturing and subsequent repairing by lessening scrap losses and by diminishing the cost of salvage in case of a bent or damaged spindle or a broken spring.

A still further object of the present invention is to provide a unit of the character described which may be rapidly and easily installed on existing level load axles by the average mechanic with simple hand tools and which is composed of a minimum number of sturdily formed parts combined in a unitary assembly of simple design affording a long operating life.

Yet another object of the present invention is to provide a device of the character above which is self-sealing in nature and which will positively prevent entry of harmful dirt or water into the assembly.

The invention possesses other objects and features of advantage, some of which, with the foregoing, will be set forth in the following descriptions of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal cross sectional view of a unit constructed in accordance with the present invention.

Figure 2 is a bottom plan view of the unit in combination with a level load axle with portions of a vehicle shown in phantom lines.

Figure 3 is a cross sectional view on an enlarged scale taken substantially on the plane of line 3—3 of Figure 2.

Figure 4 is a cross sectional view on an enlarged scale taken substantially on the plane of line 4—4 of Figure 1.

Figure 5 is a cross sectional view similar to Figure 1, but showing a modified form of the invention.

The invention consists briefly of means 11 cooperative with level load axle units 12 and 13 of the type disclosed in the aforementioned patents to provide in a unitary vehicle axle construction the above described combination of the level load and independent suspension systems. The axle units 12 and 13 here include shafts 14 and 16, which are supported and journalled in endwise alignment in bearings 17 and 18 arranged for convenient bolting or otherwise securing to a vehicle body 19, the shafts being thus supported with their inner ends 21 and 22 in confronting relation for rotation about a common axis 23. Offset wheel supporting arms 24 and 26 are secured to the outer ends of the shafts and carry in spaced parallel relation to the axis 23 spindles 27 and 28 for wheels 29 and 31. Mounted in surrounding relation to the shafts 14 and 16 are helical springs 32 and 33, which have their opposite ends fastened to the shafts (as by clips 34 and 36) and to the bearings 17 and 18 so as to resiliently resist rotation of the shafts in the bearings. As will be noted, the springs are preferably wound so as to tighten under increased load conditions.

The means 11 is arranged to provide an operating connection between the shafts 14 and 16 whereby rotative displacement of one shaft under normal or static load conditions will be transmitted to the other shaft to provide the level load character of the assembly, while shock or impact loads encountered under running or dynamic conditions will be dampened or absorbed and not so transmitted to thus provide the independent wheel suspension character of the assembly. In this manner the means 11 provides a torsional coupling and consists briefly of axially aligned socket means arranged for the receipt of and securing to the shafts 14 and 16. In the present construction the socket means includes a plurality of relatively movable sections 38, 39 and 41 with sections 38 and 39 secured to the shafts and section 41 being formed to slidably embrace and journal the inner shaft end portions 21 and 22 for maintaining the shafts in axial alignment for relative rotation about axis 23. Also included in the combination is resilient means 42 and 43 connecting sections 38 and 39 to the center section 41 and which function to permit while resiliently resisting relative rotational displacement of the shafts, thus providing a resilient torsional coupling as above mentioned.

The sections 38 and 39 are preferably of generally tubular form so as to most conveniently receive the shaft ends 21 and 22 and may be secured to the shafts in a variety of ways. In the preferred form of the invention, the sections are provided with set screws 44 and 46 threaded through boss portions 47 and 48 forming part of the sections. In the modified form of the invention as illustrated in Figure 5, the sections 38a are provided with an axially extending collar portion 49 positioned at the shafts 14a for convenient welding thereto, here indicated by the welding bead 51.

As will be best seen from Figure 1, the end sections 38 and 39 are mounted at the opposite ends 52 and 53 of the center sleeve section 41 and are generally of cup-like form providing cylindrical wall portions 54 and 56 spaced from and surrounding in concentric relation the opposite ends 52 and 53 of the center section to define annular chambers 57 and 58, therewith.

The above mentioned resilient means 42 and 43 here comprise pads of a resiliently distortable material such as rubber or the like, which conveniently, and as shown, may be in the form of annular bushings proportioned to fit within the chambers 57 and 58 for securing, as by vulcanizing, to the tube ends 52 and 53 and the flanges 54 and 56. The vulcanizing of the bushings 42 and 43 to the sections 38, 39 and 41 serves, as will be apparent from Figure 1, to effectively seal the interior of the means 11 from entry of harmful water or dirt.

In accordance with the present invention, the torsional coupling means 11 may be used in combination with axle units 12 and 13 manufactured for the purpose, or the means may be manufactured and sold as an attachment for use with and modifying existing level load axles. In the latter case, the axle units may be easily and readily prepared by simply cutting the main axle shaft medially its length and no further modification of the parts will be required.

The arrangement of the means 11 enables the use of various combinations of individual axle units having various lengths of axle shafts to provide different length assemblies. For example, a unit with a 24" shaft may be coupled to a unit with a 30" shaft to provide a supporting axle 54" over all. On the other hand, if a shop had on hand a 30" unit and a 24" unit, it could, by cutting down the 30" unit to, say, 24", build a conventional 48" axle.

Where the coupling means 11 is used in original manufacture, the ability to produce the axles in different shaft lengths gives a lower scrap loss and better utilization of material. Also, when a wheel spindle was damaged, it was heretofore necessary to discard the whole axle. With the present invention, a damaged axle only means discarding the damaged side and the other axle unit may be salvaged.

In order to achieve the combined advantages of the conventional level load axle and the advantages of the independent wheel suspension, the pads 42 and 43 must have a size and resilience capable of maintaining joint and equal rotation of shafts 14 and 16 under normal static load conditions. In other words, should all or the majority of the load be placed over one of the axle units, the pads will function to transfer part of the load to the unloaded axle unit and thus equalize the imbalance and maintain the wheel supporting arms 24 and 26 in parallel relation and the vehicle body in a level condition. On the other hand, under running and dynamic conditions, shock or impact load incident on one of the axle units will be dampened and absorbed and not transmitted in any material amount to the other axle unit. In this manner the means of the present invention provides not only the improved softer riding characteristics of individual wheel suspension, but also a greatly decreased wear due to pounding normally encountered in the shaft and wheel bearings.

I claim:

1. An attachment for a pair of axle units each having a shaft and an offset wheel supporting arm comprising, axially aligned first and second tubular sections having bores adapted for receiving said shafts, set screws carried by said sections for fastening to said shafts, a third tubular section mounted between said first and second sections and having an internal diameter equal to said bores and in axial alignment therewith for slidably receiving and journalling said shafts in axial alignment for relative rotation, said first and second sections having confronting cup-shaped portions arranged in concentrically spaced relation to the opposite ends of said third section to define annular chambers therebetween, and an annular bushing of resiliently distortable material mounted in each of said chambers and secured to said sections to provide a resilient torsional coupling therebetween.

2. A vehicle axle comprising, a pair of shafts, bearings surrounding and journaling said shafts for rotation and formed for attachment to a vehicle body to be supported by said axle with said shafts in endwise alignment for rotation about a common axis, wheel spindles carried by said shafts in radially spaced substantially parallel relation to said axis, helical springs surrounding said shafts and connected to said shafts and said bearings to resiliently resist rotative movement of said shafts in said bearings, and a torsional coupling means for said shafts including, first and second tubular sections mounted upon said shafts and secured thereto, a third section of tubular form mounted between said first and second sections and journalling said shafts in axial alignment for relative rotation, said first and second sections providing wall portions concentrically spaced from said third section, and first and second bushings of resiliently distortable material connecting said wall portions of said first and second sections respectively with said third section to provide a torsional coupling between said shafts.

3. An axle comprising, a pair of axle units each having a shaft and an offset wheel supporting arm, axially aligned first and second tubular sections embracing said shafts, means carried by said sections for fastening to said shafts, a third tubular section mounted on said shafts between said first and second sections and journaling said shafts in axial alignment for relative rotation and having its opposite ends adjacent to the inner ends of said first and second sections and in concentrically arranged relation thereto, and rubber bushings bonded to said concentrically arranged ends to provide resilient torsional couplings therebetween.

4. An attachment for a pair of axle units each having a shaft and an offset wheel supporting arm comprising, axially aligned first and second tubular sections having bores adapted for receiving said shafts, means carried by said sections for fastening to said shafts, a third tubular section mounted between said first and second sections and having an internal diameter equal to said bores and in axial alignment therewith for slidably receiving and journaling said shafts in axial alignment for relative rotation, said first and second sections having confronting cup-shaped portions arranged in concentrically spaced relation to the opposite ends of said third section to define annular chambers therebetween, and an annular bushing of resiliently distortable material mounted in each of said chambers and secured to said sections to provide a resilient torsional coupling therebetween.

References Cited in the file of this patent

UNITED STATES PATENTS

| | | |
|---|---|---|
| 1,459,223 | Lanzius | June 19, 1923 |
| 1,752,106 | Persons | Mar. 25, 1930 |
| 2,270,572 | Woolson et al. | Jan. 20, 1942 |
| 2,286,609 | Ledwinka | June 16, 1942 |
| 2,409,501 | Krotz | Oct. 15, 1946 |
| 2,455,787 | Linn | Dec. 7, 1948 |

FOREIGN PATENTS

| | | |
|---|---|---|
| 478,101 | Great Britain | Jan. 12, 1938 |